(12) United States Patent
Delker et al.

(10) Patent No.: US 8,180,037 B1
(45) Date of Patent: May 15, 2012

(54) AUTOMATED REGISTRATION FOR MOBILE DEVICE REMINDERS

(75) Inventors: Jason R. Delker, Olathe, KS (US); John Everson, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1420 days.

(21) Appl. No.: 11/173,869

(22) Filed: Jun. 30, 2005

(51) Int. Cl.
*H04M 3/42* (2006.01)
*H04N 5/445* (2011.01)

(52) U.S. Cl. ..................... 379/210.01; 725/58

(58) Field of Classification Search ............... 379/93.09, 379/210.01, 102.03, 67.1, 88.13, 88.18, 201.01; 455/186.1, 418, 41, 414.1; 709/206; 725/58, 725/104, 66
See application file for complete search history.

(56) References Cited

U.S. PATENT DOCUMENTS

| | | | |
|---|---|---|---|
| 4,763,191 A * | 8/1988 | Gordon et al. ................. | 725/104 |
| 5,151,782 A * | 9/1992 | Ferraro ........................... | 725/66 |
| 7,315,882 B1 * | 1/2008 | Koch ............................. | 709/206 |
| 7,430,554 B1 | 9/2008 | Heisinger, Jr. | |
| 7,502,453 B1 * | 3/2009 | Hasmanis et al. ........ | 379/102.03 |
| 2001/0055951 A1 * | 12/2001 | Slotznick ......................... | 455/41 |
| 2002/0028665 A1 * | 3/2002 | Mankovitz ................. | 455/186.1 |
| 2002/0076015 A1 * | 6/2002 | Norwitz et al. ............ | 379/93.09 |
| 2002/0080937 A1 * | 6/2002 | Kawamura ............... | 379/102.03 |
| 2004/0087302 A1 * | 5/2004 | Youngs et al. .................. | 455/418 |
| 2004/0194146 A1 * | 9/2004 | Bates et al. ................... | 725/110 |
| 2005/0197960 A1 * | 9/2005 | Daum et al. ..................... | 705/52 |
| 2005/0251558 A1 * | 11/2005 | Zaki .............................. | 709/206 |
| 2006/0101492 A1 * | 5/2006 | Lowcock ........................ | 725/58 |

\* cited by examiner

*Primary Examiner* — Ahmad Matar
*Assistant Examiner* — Sonia Gay

(57) ABSTRACT

A system allows automated registration for reminders to be sent to a mobile device, such as a mobile telephone. A telephone number to use to register for an automated reminder is displayed in conjunction with an advertisement for an upcoming event. A user who views the advertisement and wishes to be reminded of the program may dial the number to register for a reminder. The telephone call is received by a reminder system, which identifies the caller and determines the relevant event. The system schedules a reminder corresponding to the event, and it sends the reminder to the caller at the scheduled time. The reminder may be sent to the caller's SMS address.

19 Claims, 4 Drawing Sheets

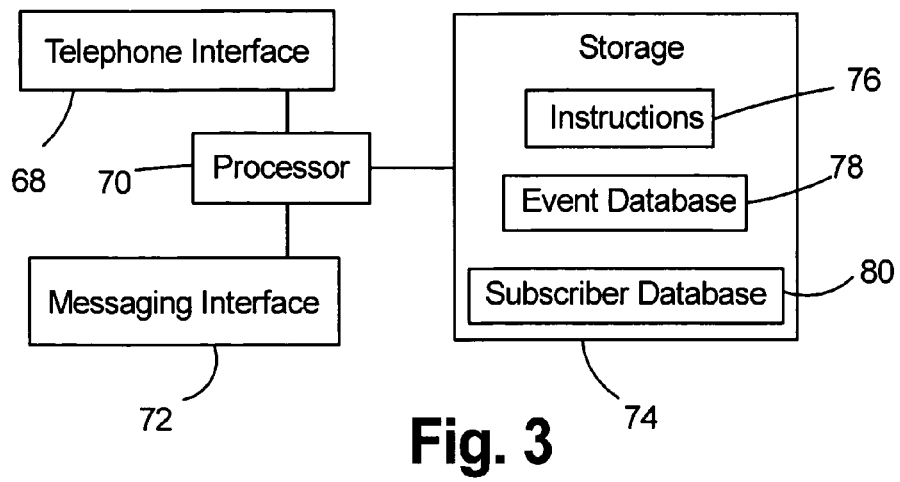
Fig. 3
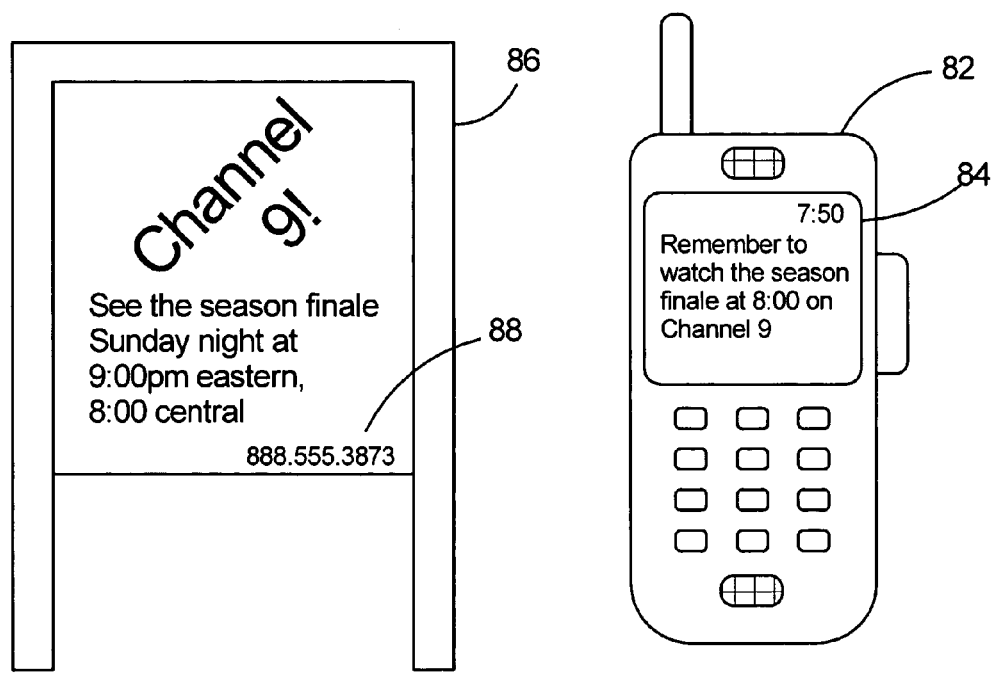
Fig. 4  Fig. 5

AUTOMATED REGISTRATION FOR MOBILE DEVICE REMINDERS

BACKGROUND

This invention relates to a system for providing reminders of upcoming events, and particularly for providing such reminders to users' mobile devices.

Television viewers can choose from an unprecedented range of programming, often scattered across over a hundred different television channels. This breadth of options can make it difficult for a viewer to find programs that interest him the most, and he may wind up watching only mediocre programs. This can be especially frustrating to a viewer who has seen an advertisement for program that promises to be especially interesting, but who winds up missing the program after forgetting when it starts. Even if a viewer remembers the program just a few minutes late, he may already have missed crucial expository scenes and may decide that the rest of the program is not worth watching.

This wealth of programming choices, and the difficulty of keeping them straight, is also a challenge for broadcasters and other programmers. It is difficult enough, in an age flooded with advertising, to win a viewer's interest in an upcoming program. But even if a viewer is interested in watching the program, he may forget to do so, and the advertisement will ultimately have failed.

Different solutions to these problems have been proposed, but they face disadvantages of their own. For example, a programmer may simply take out more advertising, building up to the airing of the program. This can be expensive, however, and may only be cost effective for programs of general interest likely to amass a large audience. In another solution, many viewers use video cassette recorders or digital video recorders. Such viewers can program these devices to record an upcoming program, but that requires that the viewer have this ability to program the device, and that he remember to do so when the device is at hand. A viewer may, for example, see a billboard or other advertisement for a program while he is driving, or on a train, and is unable to program the device. Some digital video recorders can automatically record programs that the recorder judges may be of interest to the viewer. If, however, the recorder does not recognize that the program is of interest to the viewer, it may not record the program. Furthermore, such recorders can be expensive, and they often require payment of a monthly service fee. Moreover, with the advent of satellite radio, it is becoming increasingly likely that individuals may be interested in particular radio programs, which may not be readily recorded on a video recorder.

SUMMARY

An advertisement for an event includes a telephone number to be called to schedule a reminder. After viewing such an advertisement, a person wishing to receive a reminder calls that telephone number. A reminder system receives the telephone call. The system identifies the caller and determines the event for which the caller seeks a reminder. In one embodiment, the determination of the relevant program is based at least in part on the telephone number the caller dialed and the time at which the call was made. The system schedules a reminder corresponding to the event, and it sends the reminder to the caller at the scheduled time. The reminder may be sent to the caller's mobile device at an SMS address.

BRIEF DESCRIPTION OF THE DRAWINGS

FIG. 3 is a schematic block diagram illustrating a software-based embodiment of a system for providing event reminders.

FIG. 4 illustrates an advertisement for a television program.

FIG. 5 illustrates a mobile device displaying a reminder.

DETAILED DESCRIPTION

I. Overview of One Embodiment

In one example of a system for providing event reminders, advertisements for a particular event are displayed for potential viewers to see. The event may be, for example, a television program, a theatrical event, a sports contest, a sale, or other events. A telephone number is included in these advertisements. If a potential viewer is interested in being reminded of the event, he uses his mobile telephone to dial the telephone number on the advertisement. The system receives the telephone call and automatically schedules a reminder to be sent to the viewer. At the scheduled time, the system sends a text message to the viewer's mobile telephone, reminding the viewer of the event. Where the event is a television program, the reminder is sent shortly before the program is scheduled to air.

Different telephone numbers may be assigned for different events. As a result, the prospective viewer need not expressly identify the particular program of which he wishes to be reminded. Instead, the system determines, based on the telephone number dialed, which event the viewer is interested in. At different times, the telephone number may be associated with different events, allowing the system to re-use telephone numbers once the event has ended.

II. An Exemplary Reminder System

Figure 1:
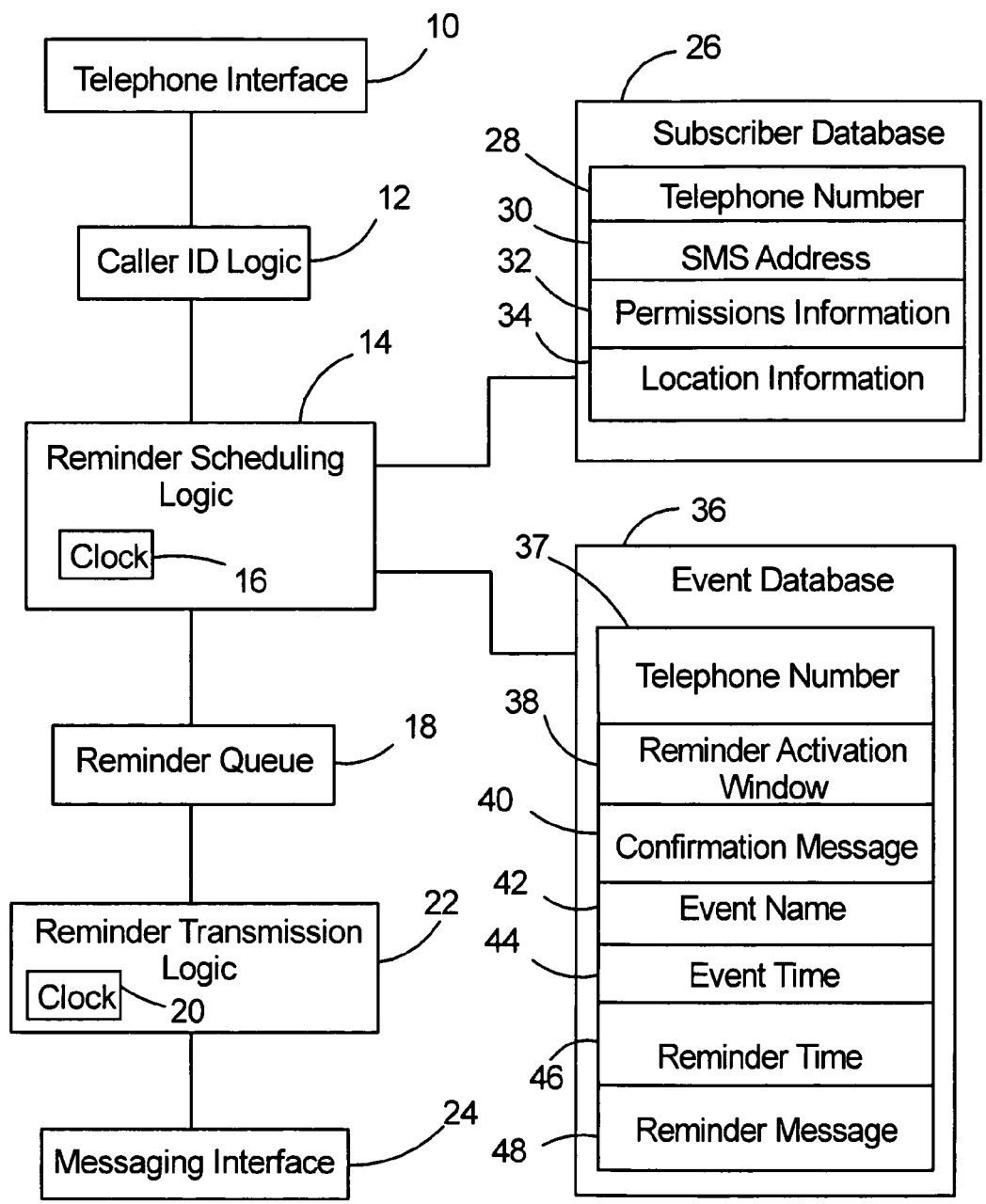
FIG. 1 is a schematic block diagram illustrating the functional architecture of a system for providing event reminders.

As illustrated in FIG. 1, a system for providing event reminders includes a telephone interface 10 and caller identification logic 12. When a viewer calls an advertised telephone number, the telephone interface 10 receives the call, and caller identification logic 12 captures caller identification information, such as the caller's telephone number.

The system is provided with reminder scheduling logic 14, which operates to schedule a reminder to be sent to the identified caller. In scheduling the reminder, the reminder scheduling logic 14 determines the event for which the reminder is to be sent and the device to which the reminder is to be sent. To these ends, the reminder scheduling logic interfaces with a subscriber database 26 and an event database 36.

The subscriber database contains information associated with viewer's identification information. In the embodiment illustrated in FIG. 1, the subscriber database 26 includes records indexed by viewers' telephone numbers 28. These records include a messaging address, such as an SMS address 30 for each viewer, which is the address to which reminders will be sent. The subscriber database 26 may include additional information of use to the system. For example, the database may include permissions information 32. The permissions information 32 can identify for what types of events the viewer wishes to receive reminders, or even whether the viewer wishes to receive reminders at all. This permissions information can help prevent the accidental activation of reminders. It can also be used in informing a viewer that he does not subscribe to a channel on which a program will be broadcast. Other information that may be stored in the subscriber database includes location information 34. The location information 34 can record, for example, the time zone in which the viewer is located, so that a reminder can be sent at a time appropriate to that viewer's time zone. The location information may also be useful in informing a viewer if an event will not be broadcast in that viewer's area.

The reminder scheduling logic 14 consults the event database 36 to identify the event for which a reminder is to be sent. An exemplary record in the event database 36 is illustrated in FIG. 1. In an embodiment in which several different telephone numbers are advertised along with different events, a record in this event database includes a telephone number 37. The telephone interface 10 may be reached by a viewer who dials any one of the advertised telephone numbers. By locating the dialed telephone number in the event database 36, the system can determine in reference to which event the viewer is calling.

A record in this event database further includes a reminder activation window 38. The reminder activation window 38 specifies a period of time during which a telephone call to the system will generate a particular reminder. This allows the same phone number to be "recycled" for different events at different times. For example, in the time window of two weeks leading up to a sports event, a call to the system generates a reminder relating to that sports event. After the event has been televised, there is no further need to generate reminders for it, so the system can generate reminders for a different event after the sports event. Thus, to schedule a reminder, the reminder scheduling logic 14 uses a clock 16 to determine the time and date on which a viewer has called. The reminder scheduling logic then looks in the event database 36 for a reminder activation window to determine in which window the call was received. Based on this information, the system determines which reminder will be sent.

The reminder scheduling logic may determine which reminder will be sent based on information in addition to the reminder activation window. For example, in a case in which different programs will be broadcast in different areas, the same advertised telephone number may correspond to the different programs. Based on the location information 34 stored in the subscriber database 26, the system determines in which area the viewer is situated, and it schedules a reminder for the program that will be broadcast in that area.

The event database illustrated in FIG. 1 also stores information that will be included in the reminder message itself. This database includes an event name 42 (such as "Season Finale") and an event time 44 (such as "9:00 pm eastern"). A reminder message may be pieced together from this information, or the entire text of the reminder may be stored as a reminder message 48 in the event database. A reminder time 46 may also be stored in the database to specify when the reminder should be sent. The reminder time is preferably shortly before the starting time of the event (e.g., ten minutes beforehand).

Once the reminder scheduling logic 16 has scheduled a reminder, it may play an audio confirmation message to the caller, saying, for example, "Thanks for calling. We'll be reminding you to watch the season finale on Sunday at 9:00." This confirmation message may be stored as an entry 40 in the event database 36.

To keep track of reminders that will be sent out, the system is provided with a reminder queue 18. The reminder queue 18 stores reminders that are to be sent out, together with information on when and to whom the reminders are to be sent. The reminder scheduling logic 14 may insert reminders in the reminder queue 18 such that the reminders are sorted in the order in which they are to be sent out.

The reminder queue is accessed by reminder transmission logic 22, which manages the transmission of reminders to viewers. The reminder transmission logic 22 is provided with a clock 20 that determines the present time and date, and the reminder transmission logic 22 monitors the reminder queue 18 to determine if it is time to send one or more reminders. When it is time to send a reminder, the reminder transmission logic 22 provides the reminder to a messaging interface 24. The messaging interface 24 sends reminder messages to viewers over a network. These reminders may be sent as, for example, an SMS (short message service) message to the requesting viewer, at the SMS address identified at entry 30 of the subscriber database 26.

III. An Exemplary Reminder Method

Figure 2:
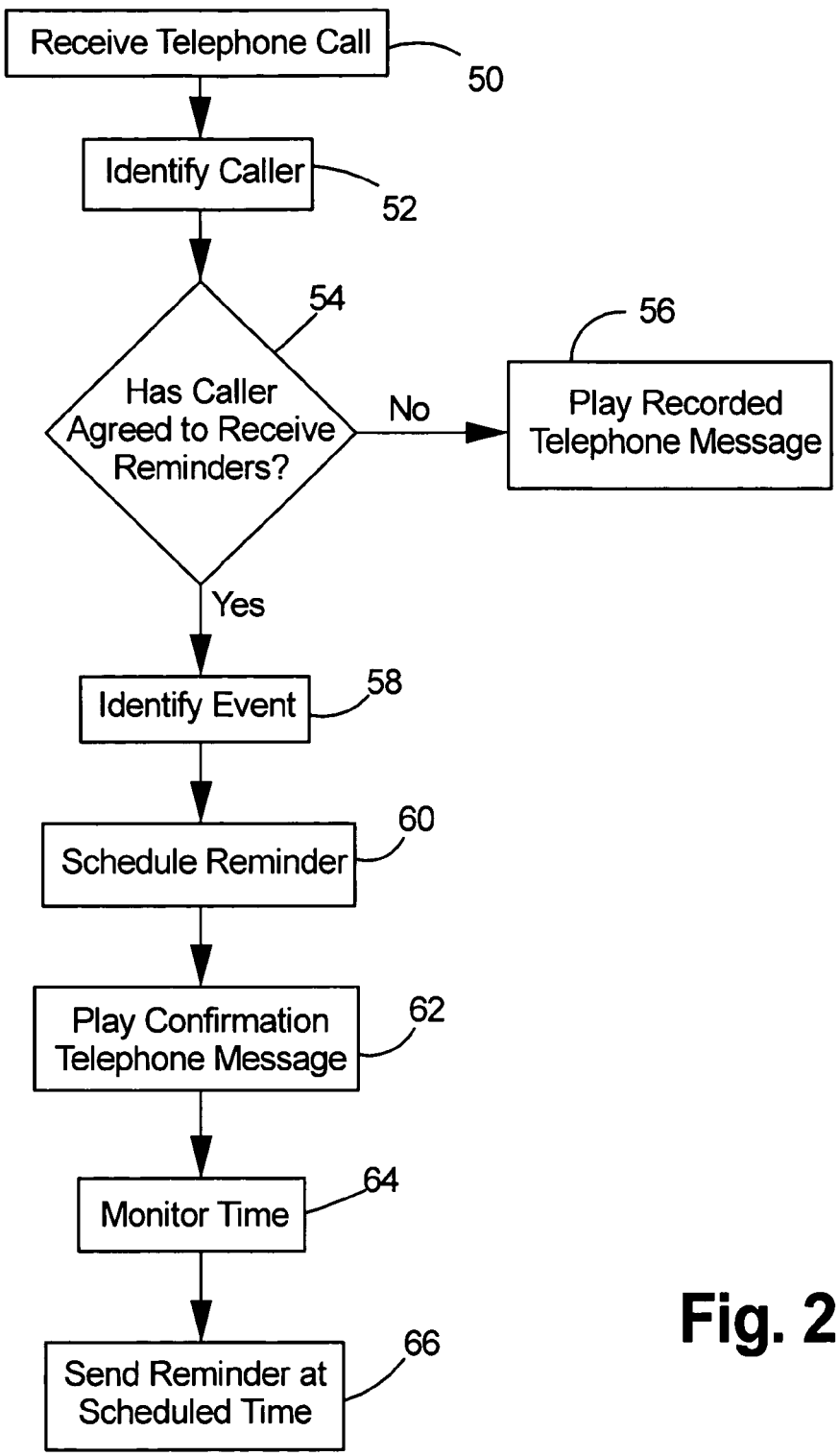
FIG. 2 is a schematic flow diagram illustrating operations performed in a system for providing event reminders.

An exemplary method for providing event reminders is illustrated in FIG. 2. In this method, the system receives in step 50 a telephone call from a viewer. In step 52, the system identifies the caller using, for example, the telephone number from which the user has called, or other "caller ID" information. Identifying the caller need not entail determining the name of the caller, or other detailed information about the caller, but rather involves learning sufficient information about the caller to determine where a reminder should be sent. In some cases, it may be sufficient to determine the caller's telephone number.

In step 54, the system determines whether the identified caller has agreed to receive event reminders. This determination may be made, for example, by checking the permissions information 32 in the subscriber database 26 (see FIG. 1).

If the caller has not agreed to receive reminders, the system may, in step 56, play a recorded audio message to the caller, indicating how the caller can sign up to receive reminders. In some embodiments, the caller may be prompted to sign up to receive reminders through a series of touch-tone prompts in the same telephone call. In other embodiments, the caller may be directed to sign up elsewhere, by visiting a Web site, for example. If the caller has agreed to receive reminders, but his permissions information indicates that the caller should not receive a reminder for a particular event, the system may inform him of the reason in step 56. For example, if the system receives a call requesting a reminder for a program to be shown on a premium television channel, the system may indicate to the caller that, according to current records, the caller does not subscribe to that channel.

If the caller has agreed to receive reminders, the system identifies the event in step 58, and it schedules the reminder in step 60. The step of scheduling the reminder may include, for example, determining the callers location and/or time zone, so that the reminder will be sent to the caller at an appropriate time. The appropriate time may be, for example, ten minutes before a program is to be aired in the caller's location. Where the event may require additional planning or effort on the caller's part (such as a sports event or concert, which may require the caller to travel to the appropriate venue) the appropriate time for a reminder may be on the order of a few hours in advance.

In one embodiment, the caller is given the option to select how far in advance the reminder should be sent. Options may include 5 minutes before the event, 30 minutes before the event, 1 hour before the event, 8 hours before the event, 1 day before the event, 3 days before the event, one week before the event, or other periods. The caller may be given the option to receive one or more reminders at different times. To determine the caller's preference of when the reminder will be sent, the system may be equipped with voice recognition and/or a DTMF (dual tone multi frequency) decoder to decode, respectively, voice and/or touch-tone selections made by the caller. The caller may use a keypad of the mobile device to select when the reminder will be sent. The selection my In scheduling a reminder, the system may play to the caller a confirmation message in step 62. This confirmation message may simply thank the caller, or it can play back to the caller information relating to the reminder.

After the reminder has been scheduled, the system is charged with sending the reminder at the proper time. To do this, the system monitors the current time in step 64, and, when it is time to send a reminder, it sends that reminder in step 66.

A system for providing event reminders may be implemented with the use of software instructions on a general purpose computer, as illustrated in FIG. 3. In that figure, a processor 70 is in communication with data storage 74. Data storage can include RAM, ROM, database servers, and any combination thereof. The storage includes instructions 76, which are executable by the processor for performing the functions described in relation to FIGS. 1 and 2. An event database 78 and a subscriber database 80 are likewise provided in the storage for the performance of these functions. The processor, in directing the operation a system for providing event reminders, communicates with a telephone interface 70, which receives incoming calls from viewers, and a messaging interface 72, which sends reminder messages created by the system.

Figure 6:
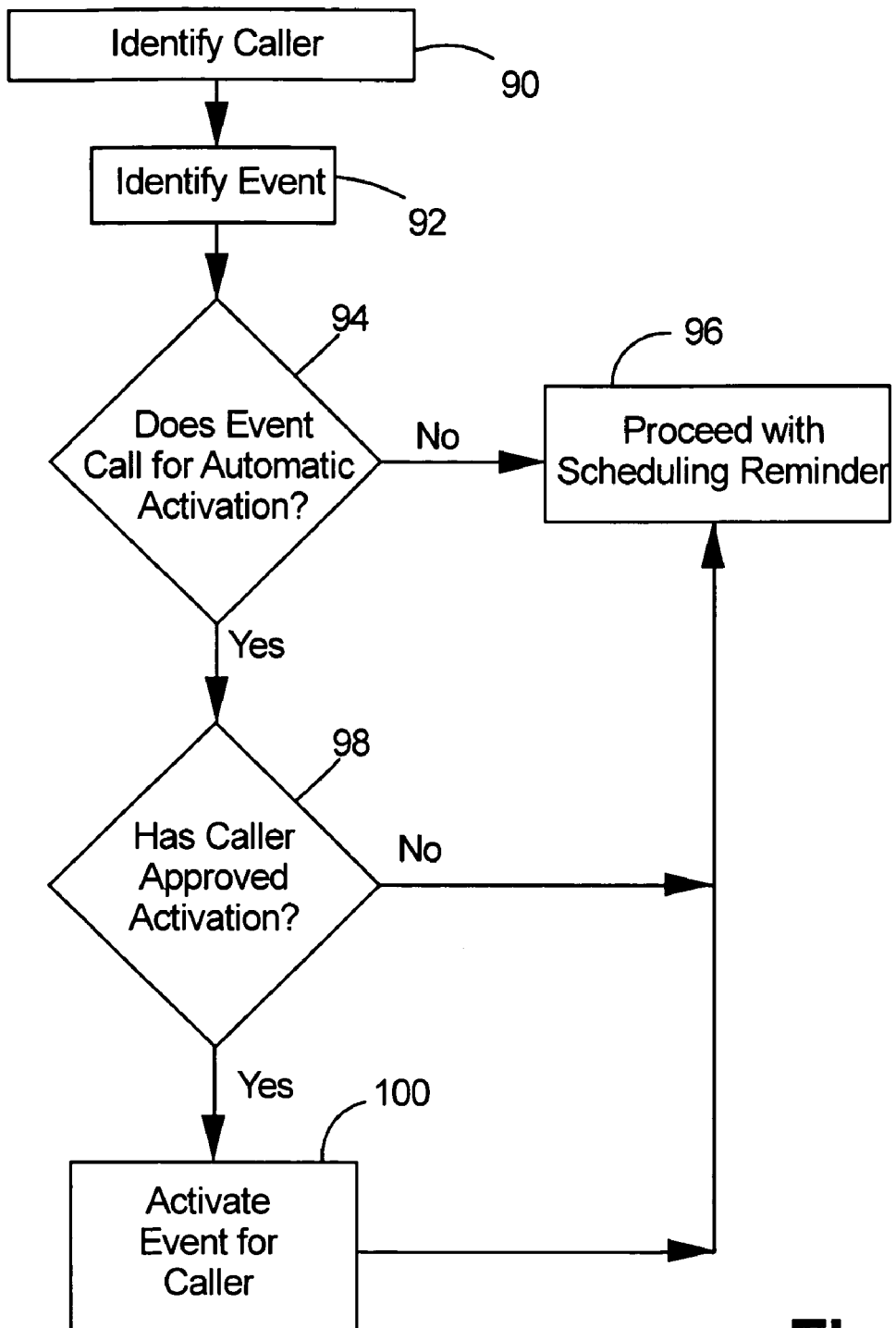
FIG. 6 is a schematic flow diagram illustrating an automatic activation feature performed by a system for providing event reminders.

FIGS. 1-3, described above, illustrate the operation of an exemplary system for providing event reminders. FIGS. 4 and 5 show the user experience provided through such a system. A prospective viewer may see an advertisement 86, as shown in FIG. 6. The advertisement 86 advises that the season finale (of some program) will be broadcast on "Channel 9" on Sunday night at 9:00 p.m. Eastern time, 8:00 Central time.

On seeing the advertisement 86, an interested viewer can use his mobile device to dial the telephone number 88 displayed on the advertisement. The telephone call reaches a system such as that illustrated in FIG. 1, which identifies the caller and schedules a reminder for the caller. As described above with respect to FIG. 2, the scheduling of the reminder may take into consideration information about the caller, such as the time zone in which the caller resides.

At the scheduled time, the system sends the reminder to the user. As illustrated in FIG. 5, the reminder 84 is displayed in the mobile device 82. As seen on the display of the mobile device 82, the reminder has arrived at 7:50, ten minutes before the 8:00 central starting time of the "season finale" program. The reminder advises the user to "Remember to watch the season finale at 8:00 on Channel 9."

Some advertised events may require or benefit from some kind of activation by the user. For example, a televised pay-per-view program requires activation in that the user must order the program before (or while) it airs. In another case, the user may have a PVR/DVR (personal video recorder/digital video recorder) that he would like to activate to record the program. As illustrated in FIG. 6, the reminder system may further operate to activate the collection and/or recording of events. Once the user has placed a call, the system in step 90 identifies the caller. In step 92, the system identifies the event concerning which the caller is placing the call. In step 94, the system determines whether the event calls for activation. For example, if the event is a regular television broadcast, programming of the caller's PVR/DVR to record the program may be appropriate. If the event is a pay-per-view television broadcast, ordering the pay-per-view broadcast on behalf of the caller may be appropriate. Information on whether activation is appropriate for the event (and, if so, the type of activation called for) may be stored in the event database 36 (FIG. 1).

Even if the event calls for a type of activation, the caller may not approve automatic activation. For example, the caller may not have a PVR/DVR, or the caller may not wish to incur the expense of pay-per-view broadcasts (or at least not immediately). As a result, the system determines in step 98 whether the caller has approved automatic activation. The approval may have been in the form of preferences stored in advance by the system, for example in the subscriber database 26 (FIG. 1). Alternatively (or in combination with pre-approval), the system may request approval for automatic activation when the subscriber makes the call. This may be performed by, for example, voice recognition and/or DTMF logic operated by the system.

If the event calls for automatic activation, and if the user approves the automatic activation, then the system activates the event in step 100. If the event calls for recording by a PVR/DVR, then the system sends a signal to the caller's PVR/DVR instructing the PVR/DVR when to begin recording. If the event is a pay-per-view broadcast event, the system may send a signal to the caller's cable box and/or cable television service provider to sign up for the event. In the case of a pay-per-view program, the system may sign the caller up to view the event and activate the caller's PVR/DVR to record the event, so that the caller can view the recorder event at a later time, even if he was not available to watch television as the event was broadcast. Information identifying the caller's pay-per-view service and/or the caller's PVR/DVR service may be stored in the subscriber database. In one embodiment, the PVR/DVR is offered as a network-based service by the reminder system or by another entitiy.

If the event does not call for any activation, or if the user does not authorize any activation, the system simply proceeds with scheduling the reminder in step 96. The system may operate both to schedule the reminder and to activate the event. This can, for example, help prevent a user from paying for a pay-per-view event that he then forgets to watch.

IV. Alternative Embodiments

Other variations that differ from the embodiments described above nevertheless fall within the scope of the invention. For example, the subscriber database and the event database may be implemented in a single database. Reminders may be sent by messaging techniques other than SMS or other text messaging including, but not limited to, telephone calls with recorded or synthesized audio reminders. Different types of advertisements may be used with the invention. Such different advertisements, which display a telephone number associated with an event, include television commercials, billboards, print advertisements, banner ads, or other forms of advertisement.

In some embodiments, communications other than telephone calls may be used to trigger the scheduling of a reminder. For example, an advertisement may display an email address or an SMS address. As an alternative to being displayed in a human-readable form, the phone number, email address, SMS address, or other address may be encoded in, for example, an RFID (radio frequency identification) tag or a bar code that can be scanned by the user's mobile device.

In consequence, the invention is not limited to the embodiments described in detail herein, but rather is defined by the following claims.

The invention claimed is:

1. A reminder method, comprising:
   receiving a telephone call from a caller;
   identifying the caller;
   identifying a selected broadcast event based at least in part on the telephone number at which the telephone call was received;
   determining that the caller has permission to receive a reminder of the selected broadcast event;
   determining whether the selected broadcast event can be activated, wherein activating the selected broadcast event comprises recording the selected broadcast event;
   in response to a determination that the selected broadcast event can be activated, prompting the caller for approval to activate the selected broadcast event;
   scheduling the reminder of the selected event to be sent to the caller at a reminder time, wherein the reminder time is based at least in part on a time at which the selected event is scheduled to be broadcast in the caller's time zone; and
   sending the reminder to the caller at the reminder time and recording the selected broadcast event.

2. The method of claim 1, further comprising:
   displaying an advertisement for an event; and
   displaying, together with the advertisement, a telephone number associated with the event.

3. The method of claim 1, wherein the identification of the selected event is based at least in part on the time at which the telephone call was received.

4. The method of claim 1, wherein the identification of the caller is based at least in part on the telephone number from which the telephone call was received.

5. The method of claim 1, further comprising determining a messaging address of the caller, wherein the reminder is sent to the caller at the messaging address.

6. The method of claim 5, wherein the messaging address is an SMS address.

7. A reminder method, comprising:
   displaying an advertisement for a future broadcast event;
   displaying, together with the advertisement, a reminder telephone number associated with the event;
   receiving a telephone call from a caller at the reminder telephone number;
   identifying the event at least in part from the time at which the telephone call is received;
   determining that the caller has permission to receive a reminder of the event;
   determining whether the event can be activated, wherein activating the event comprises recording the event;
   in response to a determination that the event can be activated, prompting the caller for approval to activate the event; and
   sending the reminder of the event to the caller at a reminder time based at least in part on a time at which the selected event is scheduled to be broadcast in the caller's time zone, and recording the selected broadcast event.

8. The method of claim 7, further comprising identifying the caller based at least in part on the telephone number from which the call was received.

9. The method of claim 7, further comprising determining a messaging address of the caller, wherein the reminder is sent to the caller at the messaging address.

10. The method of claim 9, wherein the messaging address is an SMS address.

11. A reminder method, comprising:
    receiving a telephone call from a caller;
    identifying the caller;
    identifying a broadcast event;
    determining whether a caller has permission to receive a reminder for the broadcast event;
    determining whether the broadcast event can be activated, wherein activating the broadcast event comprises recording the broadcast event; and
    in response to a determination that the selected event can be activated, prompting the caller for approval to activate the broadcast event; and
    sending the reminder to the caller at the reminder time and recording the selected broadcast event.

12. The method of claim 11, further comprising prompting the caller to agree to receive the reminder for the broadcast event.

13. The method of claim 11, further comprising prompting the caller to select a reminder time.

14. The method of claim 1, further comprising prompting the caller to select the reminder time.

15. The method of claim 1, further comprising prompting the caller to select how far in advance of the selected broadcast event the reminder time should be.

16. The method of claim 7, further comprising prompting the caller to select the reminder time.

17. The method of claim 1, wherein the steps are performed as a network-based service.

18. The method of claim 7, wherein the steps are performed as a network-based service.

19. The method of claim 11, wherein the steps are performed as a network-based service.

* * * * *